United States Patent [19]

Uehara et al.

[11] 4,140,940
[45] Feb. 20, 1979

[54] GREEN EMITTING FLUORESCENT COMPOSITION AND COLOR TELEVISION CATHODE RAY TUBE USING THE SAME

[75] Inventors: Yasuhiko Uehara, Mobara; Susumu Ohmatoi, Fujisawa, both of Japan

[73] Assignees: Hitachi, Ltd., Tokyo; Dai Nippon Toryo Co., Ltd., Osaka, both of Japan

[21] Appl. No.: 816,078

[22] Filed: Jul. 15, 1977

[30] Foreign Application Priority Data

Jul. 19, 1976 [JP] Japan .................. 51-85074

[51] Int. Cl.² ............. C09K 11/18; C09K 11/46; H01J 29/20
[52] U.S. Cl. .................. 313/467; 313/468; 252/301.4 R; 252/301.4 S; 252/301.6 S
[58] Field of Search .............. 252/301.6 S, 301.4 R, 252/301.4 S; 313/467, 468

[56] References Cited

U.S. PATENT DOCUMENTS

| | | | |
|---|---|---|---|
| 2,623,858 | 12/1952 | Kroger | 252/301.6 S |
| 3,891,886 | 6/1975 | Woontner | 252/301.6 S X |
| 4,038,205 | 7/1977 | Minnier et al. | 252/301.6 S |

OTHER PUBLICATIONS

VanGool et al., "Philips Res. Repts.", 15, pp. 254–274, 1960.
"Fluorescent Lamps & Lighting", Edited by Elenbaas, Chapter III, pp. 31–33, 42–44, 1962.

*Primary Examiner*—Jack Cooper
*Attorney, Agent, or Firm*—Gerald J. Ferguson, Jr.; Joseph J. Baker

[57] ABSTRACT

A cubic ZnS:Cu,Al phosphor and a cubic ZnS:Au,Al phosphor is mixed to provide a green emitting phosphor coposition. This composition emits green light having a color which is represented by a color point in the CIE standard chromaticity diagram having x-value and y-value within the ranges of $0.300 < x < 0.360$ and $0.575 < y < 0.635$, respectively, when excited by an electron beam. A color television cathode ray tube uses the fluorescent composition as a green emitting phosphor component, and a ZnS:Ag phosphor or a ZnS:Ag,Al phosphor as a blue emitting phosphor component, and a $Y_2O_2S$:Eu phosphor, a $Y_2O_3$:Eu phosphor or a $YVO_4$:Eu phosphor as a red emitting phosphor component.

3 Claims, 1 Drawing Figure

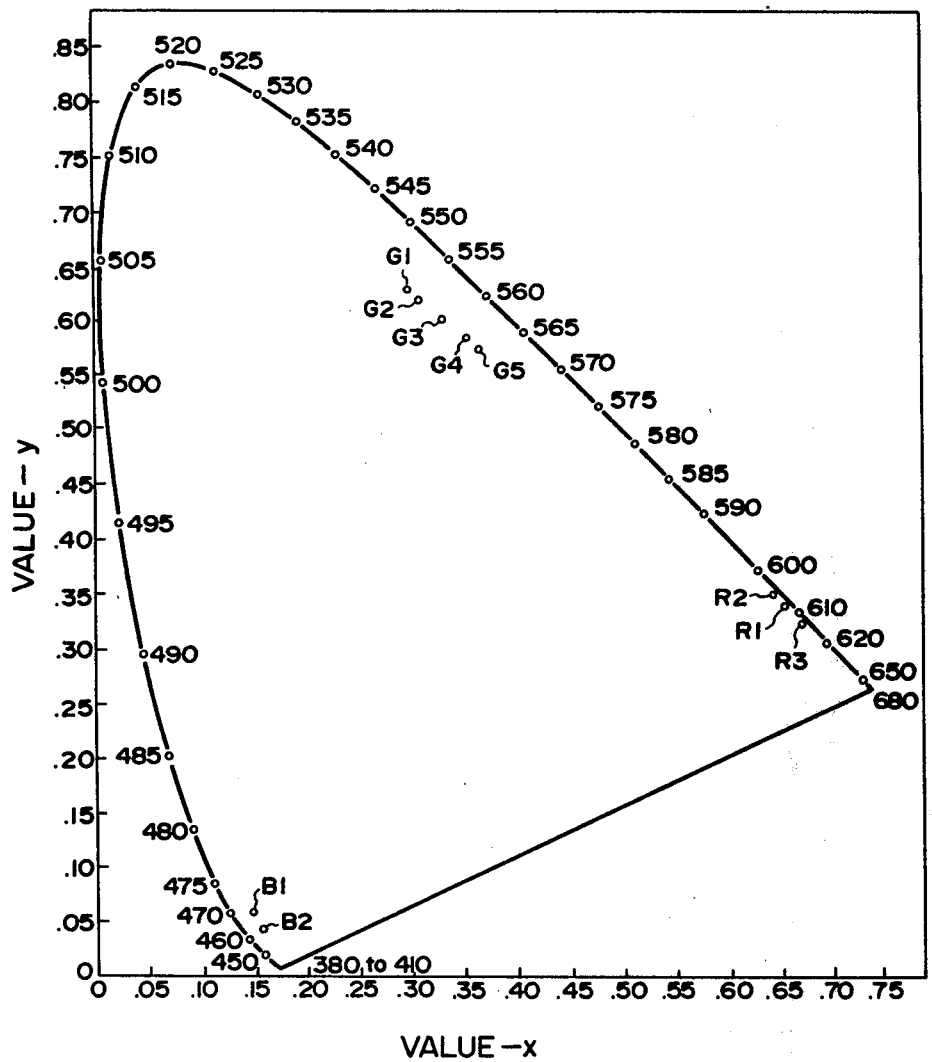

GREEN EMITTING FLUORESCENT COMPOSITION AND COLOR TELEVISION CATHODE RAY TUBE USING THE SAME

BACKGROUND OF THE INVENTION

1. Field of the Invention

This invention relates to a green emitting fluorescent composition and a cathode ray tube for color television using the same as a green emitting phosphor component, and more particularly to a green emitting fluorescent composition of a mixture of a copper and aluminium activated zinc sulfide phosphor and a gold and aluminium activated zinc sulfide phosphor used as a green emitting phosphor component for the fluorescent screen of a color television cathode ray tube and also to a color television cathode ray tube using the same.

2. Description of the Prior Art

The fluorescent screen of a color television cathode ray tube is comprised of a number of dots or stripes of green, blue and red emitting phosphor components and presents various colors of light when excited by an electron beam. In the conventional color television cathode ray tubes, there have been used a copper and aluminium activated zinc cadmium sulfide phosphor [(Zn,Cd)S:Cu,Al] as a green emitting phosphor component, a silver activated zinc sulfide phosphor (ZnS:Ag) or a silver and aluminium activated zinc sulfide phosphor (ZnS:Ag,Al) as a blue emitting phosphor component, and a europium activated yttrium oxysulfide phosphor ($Y_2O_2S$:Eu) or a europium activated yttrium oxide phosphor ($Y_2O_3$:Eu) or a europium activated yttrium vanadate phosphor ($YVO_4$:Eu) as a red emitting phosphor component.

As shown in the above description, cadmium is an essential element for the fluorescent screen of a color television cathode ray tube. However, cadmium is a highly noxious metal, and accordingly requires a great care in handling the same in the process of coating the fluorescent screen in the cathode ray tube. Further, the cathode ray tube using cadmium in its fluorescent screen requires a great care in handling the same when it is broken or destroyed. In addition, since the allowable concentration of cadmium in waste materials is severly limited by the anti-polution law, a large scaled equipment is needed to treat the waste materials. Thus, it is economically very disadvantageous to use cadmium in the fluorescent screen.

Under the above described circumstances, it has been known to use a copper and aluminium activated zinc sulfide phosphor (ZnS:Cu,Al) mainly of cubic structure instead of the copper and aluminium activated zinc cadmium sulfide phosphor (Zn,Cd)S:Cu,Al. However, the copper and aluminium activated zinc sulfide phosphor (ZnS:Cu,Al) mainly of cubic structure (hereinafter referred to simply as "cubic ZnS:Cu,Al phosphor") lowers the white light luminance. The luminance of the color cathode ray tube, namely the brightness, is generally evaluated by the white light luminance represented by the luminance of a white point (x=0.281, y=0.311) in the JEDEC (Joint Election Device Engineering Councils) standard. In the conventional copper and aluminium activated zinc cadmium sulfide used as a green emitting phosphor component in the conventional color television cathode ray tube, the spectrum of the emitted light can easily be made to be in the long wavelength side of green by increasing the amount of cadmium which constitutes the host material of the phosphor. Actually, in the conventional color television cathode ray tube, the (Zn,Cd)S:Cu,Al phosphor which emits green light biased to yellow is used, and accordingly it has been possible to increase the share of the exciting current for the green emitting phosphor component which has a high emission efficiency in comparison with the red emitting phosphor component. Therefore, a very high white luminance is obtainable. On the other hand, in the cubic ZnS:Cu,Al phosphor which does not contain cadmium, the green light emitted is biased to the short wavelength side and it is very difficult to shift the color of the emitted light to yellow side beyond the color point of (x=0.300, y=0.630) in the CIE standard chromaticity diagram. Therefore, when this phosphor is used as the green emitting phosphor component, the share of the exciting current for the red emitting phosphor component which has a low emission efficiency in comparison with the green emitting phosphor component is inevitably increased in comparison with the conventional (Zn,Cd)S:Cu,Al phosphor. Consequently, the white luminance is lowered about 10%.

In view of the above described state of the art, it is desired to provide a green emitting phosphor for a color television cathode ray tube which does not contain noxious cadmium like the cubic ZnS:Cu,Al phosphor, emits light of the wavelength biased to the long wavelength side more than the cubic ZnS:Cu,Al phosphor, and results in increase in the white luminance in comparison with the case wherein the cubic ZnS:Cu,Al phosphor is used.

SUMMARY OF THE INVENTION

The object of the present invention is, therefore, to provide a fluorescent composition which does not contain cadmium and emits green light biased to the long wavelength side.

Another object of the present invention is to provide a color television cathode ray tube in which the white luminance is increased.

In accordance with the present invention, a gold and aluminium activated zinc sulfide phosphor mainly of cubic structure (hereinafter referred to simply as "cubic ZnS:Au,Al phosphor") which emits yellow light is mixed with a cubic ZnS:Cu,Al phosphor to shift the spectrum of emission of the latter phosphor to the long wavelength side, namely to yellow side, whereby the share of the exciting current for the red emitting phosphor component which has a low emission efficiency in comparison with the green emitting phosphor component is lowered in the color television cathode ray tube using said mixture of the phosphors as the green emitting phosphor component and the white luminance of the cathode ray tube is increased.

In other words, the green emitting fluorescent composition for a cathode ray tube for color television in accordance with the present invention is a mixture of phosphors of a cubic ZnS:Cu,Al phosphor and a cubic ZnS:Au,Al phosphor and is characterized in that the x-value and y-value in the CIE standard chromaticity diagram of the color emitted when excited by an electron beam are within the ranges of $0.300 < X < 0.360$ and $0.575 < y < 0.635$, respectively.

The color television cathode ray tube in accordance with the present invention is characterized in that fluorescent screen thereof uses the above described mixture of phosphors as a green emitting phosphor component, a ZnS:Ag phosphor activated by $10^{-5}$ to $10^{-3}$ g of Ag per one gram of the host material ZnS or a ZnS:Ag,Al phosphor activated by $10^{-5}$ to $10^{-3}$ g of Ag and Al, respectively, per one gram of the host material ZnS as a blue emitting phosphor component, and a $Y_2O_2S:Eu$ phosphor, a $Y_2O_3:Eu$ phosphor or a $YVO_4$:Eu phosphor activated by $10^{-2}$ to $1.5 \times 10^{-1}$ g of Eu per one gram of the host material $Y_2O_2S$, $Y_2O_3$ and $YVO_4$, respectively, as a red emitting phosphor component.

BRIEF DESCRIPTION OF THE DRAWING

A single FIGURE is a graphical representation showing the color points of the conventionally known cubic ZnS:Cu,Al phosphor used as a green emitting phosphor component in the conventional color television cathode ray tube, the green emitting phosphor, the blue emitting phosphor and the red emitting phosphor used in the color television cathode ray tube in accordance with the present invention in the CIE standard chromaticity diagram.

DESCRIPTION OF THE PREFERRED EMBODIMENTS

The cubic ZnS:Cu,Al phosphor constituting the mixed green emitting phosphor of the present invention is prepared by adding a proper amount of copper compounds an as activator Cu such as cupper sulfate ($CuSO_4.5H_2O$) and copper nitrate [$Cu(NO_3)_2.6H_2O$] and a proper amount of aluminium compounds as an activator Al such as aluminium sulfate [$Al_2(SO_4)_3.18H_2O$] and aluminium nitrate [$Al(NO_3)_3.9H_2O$] to a reagent zinc sulfide, and normally adding further thereto a proper amount of flux such as alkaline metal halide and alkaline earth metal halide, and then firing the mixture at a temperature of 750° C. to 1030° C. in a reducing atmosphere which is generally used in manufacturing sulfide phosphors such as a hydrogen sulfide atmosphere or a sulfiding atmosphere containing carbon disulfide. From the viewpoint of luminance and emitted color, the preferable amounts of the activators Cu and Al are $10^{-5}$ g to $3 \times 10^{-4}$ g and $5 \times 10^{-6}$ g to $3 \times 10^{-3}$ g per one gram of the host material ZnS, respectively. The x-value and y-value of the color point in the CIE standard chromaticity diagram of the light emitted by the cubic ZnS:Cu,Al phosphor prepared as described above and containing the activators of the amount within the above described preferable range are $0.280 < x < 0.300$ and $0.620 < y < 0.640$.

On the other hand, the yellow emitting cubic ZnS:Au,Al phosphor which is another component constituting the mixed green emitting phosphor of the present invention is prepared by adding a proper amount of gold compounds as an activator Au such as gold chloride acid ($HAuCl_4.2H_2O$) and a proper amount of aluminium compounds as an activator Al such as aluminium sulfate [$Al_2(SO_4)_3.18H_2O$] and aluminium nitrate [$Al(NO_3)_3.9H_2O$] to a reagent zinc sulfide, and normally adding further thereto a proper amount of flux such as alkaline metal halide and alkaline earth metal halide, and then firing the mixture at a temperature of 950° C. to 1030° C. in a reducing atmosphere which is generally used in manufacturing sulfide phosphors such as a hydrogen sulfide atmosphere or a sulfiding atmosphere containing carbon disulfide. From the viewpoint of luminance and emitted color, the preferable amounts of the activators Au and Al are $5 \times 10^{-4}$ g to $10^{-2}$ g and $5 \times 10^{-5}$ g to $10^{-2}$ g per one gram of the host material ZnS, respectively. The x-value and y-value of the color point in the CIE standard chromaticity diagram of the light emitted by the cubic ZnS:Au,Al phosphor prepared as described above and containing the activators of the amount within the above described preferable range are $0.385 < x < 0.405$ and $0.550 < y < 0.570$.

The green emitting fluorescent composition of the present invention which has been referred to as a mixed green emitting phosphor is prepared by mixing the above described cubic ZnS:Cu,Al phosphor and the above described cubic ZnS:Au,Al phosphor so that the x-value and y-value of the color point of the light emitted thereby when excited with an electron beam may be within the ranges of $0.300 < x < 0.360$ and $0.575 < y < 0.635$. When mixing the two phosphors, both the phosphors are preferred to contain the activators of the amount within the above described preferable ranges. When the x-value or y-value of the color point of the light emitted by the above fluorescent composition is lower than the above described range, the emitted color is shifted to the short wavelength side, and accordingly the color television cathode ray tube using this composition as the green emitting phosphor component does not give a sufficiently high white luminance. On the other hand, when the x-value or y-value of the color point of the light emitted is higher than the above described range, the emitted color is shifted to the long wavelength side and becomes yellowish, and accordingly the purity of green is degraded and the area of the color reproduction region becomes markedly narrow though the color television cathode ray tube using this composition as the green emitting phosphor component gives a greatly enhanced white luminance.

The green emitting fluorescent composition in accordance with the present invention is characterized in that no cadmium is contained and the color point of the light emitted by the cubic ZnS:Cu,Al is properly shifted to the long wavelength side. In the CIE standard chromaticity diagram in the accompanying drawing, the color point G1 shows an example of the color of the light emitted by the cubic ZnS:Cu,Al phosphor, and the color points G2 to G5 show examples of the color of the light emitted by the green emitting fluorescent composition in accordance with the present invention. As shown by these color points, it is clear that the color of the light emitted by the fluorescent composition of this invention is biased to the long wavelength side in comparison with the color of the light emitted by the cubic ZnS:Cu,Al phosphor. Since the fluorescent composition of this invention emits color biased to the long wavelength side, the color television cathode ray tube using this composition as a green emitting phosphor component gives an enhanced white luminance in comparison with the conventional color television cathode ray tube using the cubic ZnS:Cu,Al phosphor as the green emitting phosphor component.

Now the color television cathode ray tube in accordance with the present invention will be described in detail.

As the green emitting phosphor component used in the fluorescent screen of the color television cathode ray tube of this invention, the above described green emitting fluorescent composition is used. As the blue and red emitting phosphor components are used the conventional phosphors. For instance, as the blue emitting phosphor may be used a ZnS:Ag phosphor or a ZnS:Ag,Al phosphor, and as the red emitting phosphor may be used a $Y_2O_2S:Eu$ phosphor, a $Y_2O_3:Eu$ phosphor or a $YVO_4:Eu$ phosphor. The amount of Ag contained in the ZnS:Ag phosphor per one gram of the host material ZnS is within the range of $10^{-5}$ to $10^{-3}$ g and more preferably $5\times10^{-5}$ to $3\times10^{-4}$ g. The amount of Ag and Al contained in the ZnS:Ag,Al phosphor per one gram of the host material ZnS within the range of $10^{-5}$ to $10^{-3}$ g respectively and more preferably $5\times10^{-5}$ to $3\times10^{-4}$ g. In the drawing, the color points B1 (x=0.148, y=0.058) and B2 (x=0.155, y=0.040) are indicative of the colors emitted by the ZnS:Ag phosphor activated by $2\times10^{-4}$ g of Ag and the ZnS:Ag,Al phosphor activated by $2\times10^{-4}$ g of Ag and Al, respectively per one gram of the host material ZnS. The amount of Eu contained in the above described red emitting phosphors per one gram of the host material is within the range of $10^{-2}$ to $1.5\times10^{-1}$ g and more preferably $5\times10^{-2}$ to $6\times10^{-2}$ g for $Y_2O_2S$:Eu phosphors, and $7\times10^{-2}$ to $8\times10^{-2}$ g for $YVO_4$:Eu phosphor. In the drawing, the color points R1 (x=0.652, y=0.346), R2 (x=0.642, y=0.352) and R3 (x=0.668, y=0.328) are indicative of the colors emitted by the $Y_2O_2S$:Eu phosphor activated by $5\times10^{-2}$ g of Eu, the $Y_2O_3$:Eu phosphor activated by $5\times10^{-2}$ g of Eu, and the $YVO_4$:Eu phosphor activated by $7\times10^{-2}$ g of Eu, respectively per one gram of the host material. The above three color emitting phosphor components are applied on the face plate of the cathode ray tube in dots or stripes to form a fluorescent screen thereon by a photoprinting method which is generally adopted to form a fluorescent screen in the conventional color television cathode ray tube.

The fluorescent screen of the color television cathode ray tube in accordance with the present invention as described in detail hereinabove does not contain cadmium and emits green light which is desirably shifted to the long wavelength side in comparison with the conventional color television cathode ray tube using the cubic ZnS:Cu,Al phosphor as the green emitting phosphor component, and gives a higher white luminance than the conventional tube as shown in the examples which will be described hereinafter. Further, in the color television cathode ray tube of this invention, the color of the light emitted by the green emitting fluorescent composition used therein can easily be selected over a wide range by varying the mixing ratio of the cubic ZnS:Cu,Al phosphor to the cubic ZnS:Au,Al phosphor. Therefore, it is easy to obtain a color television cathode ray tube having a desired color of green emission and a desired area of color reproducing region.

Now the present invention will be described in detail with reference to several examples thereof.

EXAMPLES

A cubic ZnS:Cu,Al phosphor containing $1.3\times10^{-4}$ g of Cu and $10^{-4}$ g of Al per one gram of ZnS as activators was prepared. The color point of the emitted light of this phosphor was (x=0.293, y=0.631). A cubic ZnS:Au,Al phosphor containing $1.4\times10^{-3}$ g of Au and $5\times10^{-3}$ g of Al as activators was prepared. The color point of the emitted light of this phosphor was (x=0.395, y=0.560). The luminance of the phosphor when excited by an electron beam of 20KV and 1μA/cm$^2$ was 86% of that of said cubic ZnS:Cu,Al phosphor.

The above cubic ZnS:Cu,Al phosphor and cubic ZnS:Au,Al phosphor were mixed in the mixing ratios of 9:1, 7:3, 13:12 and 2:3 by weight to make four kinds of green emitting fluorescent compositions of this invention. The color point and the white luminance of the cubic ZnS:Cu,Al phosphor (Sample No. 1) and the four kinds of the green emitting fluorescent compositions (Sample No. 2 to No. 5) are shown in Table I below. The color points thereof are also shown in the accompanying drawing. In Table I, the white luminance is represented by relative values in which the white luminance of the cubic ZnS:Cu,Al phosphor (Sample No. 1) is set to be 100%.

TABLE I

| No. | Mixing Weight Ratio [(ZnS:Cu,Al phosphor):(ZnS:Au,Al phosphor)] | Color Point | | White Luminance (%) |
|---|---|---|---|---|
| 1 | ZnS:Cu,Al phosphor only | x = 0.293  y = 0.631 | (G1) | 100 |
| 2 | 9:1 | x = 0.305  y = 0.625 | (G2) | 98 |
| 3 | 7:3 | x = 0.333  y = 0.601 | (G3) | 96 |
| 4 | 13:12 | x = 0.352  y = 0.588 | (G4) | 92 |
| 5 | 2:3 | x = 0.358  y = 0.580 | (G5) | 90 |

*Excited by 20KV, 1μA/cm$^2$ electron beam

As shown in the drawing and Table I, the white luminance of the green emitting fluorescent compositions (Sample No. 2 to No. 5) is lower than that of the cubic ZnS:Cu,Al phosphor, but the emitted color of the compositions is biased to the long wavelength side in comparison with the conventional phosphor.

Then, twenty-five samples consisting of five samples for each of five kinds of 20 inch color television cathode ray tubes using said five kinds of fluorescent compositions and phosphor as shown in Table I, respectively, were prepared. In these samples, as the blue and red emitting phosphor components, a ZnS:Ag phosphor containing $2\times10^{-4}$ g of Ag and a $Y_2O_2S$:Eu phosphor containing $5\times10^{-2}$ g of Eu per one gram of the host material were used, respectively, and the three kinds of phosphor components were applied on the face plate of a cathode ray tube in dots. The mean value of the cathode current of the color television cathode ray tubes for each of the five kinds of tubes was measured. The measured mean values are shown in Table II below.

Table II shows the mean values of the cathode current for the five kinds of samples of the color television cathode ray tubes which was required to obtain a predetermined white luminance (170 radlux). In Table II, RIk, GIk and BIk show the cathode current required to excite the red, green and blue emitting phosphor components respectively in order to obtain the predetermined white luminance. ΣIk shows the total cathode current of these three cathode currents. The smaller are the respective Ik values, the higher is the relative luminance of the respective color of the tube, and the smaller is the ΣIk value, the higher is the relative white luminance.

TABLE II

| Sample Group No. | RIk | GIk | BIk | ΣIk |
|---|---|---|---|---|
| 1 | 48.9 | 39.0 | 28.4 | 116.3 |
| 2 | 45.0 | 39.5 | 27.5 | 112.0 |
| 3 | 39.5 | 41.9 | 27.9 | 109.3 |
| 4 | 36.4 | 44.2 | 28.5 | 109.1 |
| 5 | 32.9 | 46.0 | 30.0 | 108.9 |

*predetermined white luminance ... 170 radlux
*cathode current ... mean value of cathode currents for five samples in each sample group As shown in Table II, the higher is the mixing weight ratio of the cubic ZnS:Au,Al phosphor to the cubic ZnS:Cu,Al phosphor, the higher is GIk namely the lower is the green luminance. However, as the mixing weight ratio increases, the value RIk is markedly lowered. In samples 2, 3, 4 and 5, RIk was lowered by 8%, 19%, 26% and 33%, respectively. Accordingly, ΣIk was lowered and the relative white luminance was increased by 3.8%, 6.4%, 6.6% and 6.8%, respectively.

In the above described examples, a ZnS:Ag phosphor was used as the blue emitting phosphor component, and a $Y_2O_2S$:Eu phosphor was used as the red emitting phosphor component. It was, however, confirmed that the similar results were obtained when a ZnS:Ag,Al phosphor was used instead of the ZnS:Ag phosphor and a $Y_2O_3$:Eu phosphor or a $YVO_4$:Eu phosphor was used instead of the $Y_2O_2S$:Eu phosphor.

We claim:

1. A green emitting fluorescent composition for a color television cathode ray tube comprising a copper and aluminum activated zinc sulfide phosphor mainly of cubic structure, the zinc sulfide being activated by $10^{-5}$ g to $3 \times 10^{-4}$ g of copper and $5 \times 10^{-6}$ g to $3 \times 10^{-3}$ g of aluminum respectively per one gram of the zinc sulfide, and a gold and aluminum activated zinc sulfide phosphor mainly of cubic structure, the zinc sulfide being activated by $5 \times 10^{-4}$ g to $10^{-2}$ g of gold and $5 \times 10^{-5}$ g to $10^{-2}$ g of aluminum respectively per one gram of the zinc sulfide, wherein the x-value and y-value in the CIE standard chromaticity diagram of the color emitted by said copper and aluminum activated zinc sulfide phosphor when excited by an electron beam are within the ranges of $0.280 < x < 0.300$ and $0.620 < y < 0.640$, respectively, the x-value and y-value in the CIE standard chromaticity diagram of the color emitted by said gold and aluminum activated zinc sulfide phosphor when excited by an electron beam are within the ranges of $0.385 < x < 0.405$ and $0.550 < y < 0.570$, respectively, and the x-value and y-value in the CIE standard chromaticity diagram of the color emitted by said composition when excited by an electron beam are within the ranges of $0.300 < x < 0.360$ and $0.575 < y < 0.635$, respectively.

2. A cathode ray tube for color television provided with a fluorescent screen comprising a green emitting phosphor, a blue emitting phosphor and a red emitting phosphor, said green emitting phosphor being green emitting fluorescent composition comprising a copper and aluminum activated zinc sulfide phosphor mainly of cubic structure, the zinc sulfide being activated by $10^{-5}$ g to $3 \times 10^{-4}$ g of copper and $5 \times 10^{-6}$ g to $3 \times 10^{-3}$ g of aluminum respectively per one gram of the zinc sulfide, and a gold and aluminum activated zinc sulfide phosphor mainly of cubic structure, the zinc sulfide being activated by $5 \times 10^{-4}$ g to $10^{-2}$ g of gold and $5 \times 10^{-5}$ g to $10^{-2}$ g of aluminum respectively per one gram of the zinc sulfide, wherein the x-value and y-value in the CIE standard chromaticity diagram of the color emitted by said copper and aluminum activated zinc sulfide phosphor when excited by an electron beam are within the ranges of $0.280 < x < 0.300$ and $0.620 < y < 0.640$, respectively, the x-value and y-value in the CIE standard chromaticity diagram of the color emitted by said gold and aluminum activated zinc sulfide when excited by an electron beam are within the ranges of $0.385 < x < 0.405$ and $0.550 < y < 0.570$, respectively, and the x-value and y-value in the CIE standard chromaticity diagram of the color emitted by said composition when excited by an electron beam are within the ranges of $0.300 < x < 0.360$ and $0.575 < y < 0.635$ respectively, said blue emitting phosphor being a silver activated or silver and aluminum activated zinc sulfide phosphor in which zinc sulfide is activated by $10^{-5}$ g to $10^{-3}$ g of silver or silver and aluminum respectively per one gram of the zinc sulfide, said red emitting phosphor being a europium activated yttrium oxysulfide phosphor, a europium activated yttrium oxide phosphor or a europium activated yttrium vanadate phosphor each activated by $10^{-2}$ g to $1.5 \times 10^{-1}$ g of europium per one gram of the yttrium oxysulfide, yttrium oxide or yttrium vanadate, respectively.

3. A cathode ray tube for color television as defined in claim 3 wherein said silver activated zinc sulfide phosphor is activated by $5 \times 10^{-5}$ g to $3 \times 10^{-4}$ g of silver per one gram of the zinc sulfide, said silver and aluminium activated zinc sulfide phosphor is activated by $5 \times 10^{-5}$ g to $3 \times 10^{-4}$ g of silver and aluminium per one gram of the zinc sulfide respectively, said europium activated yttrium oxysulfide phosphor is activated by $5 \times 10^{-2}$ g to $6 \times 10^{-2}$ g europium per one gram of the yttrium osysulfide, said europium activated yttrium oxide phosphor is activated by $5 \times 10^{-2}$ g to $6 \times 10^{-2}$ g of europium per one gram of the yttrium oxide, and said europium activated yttrium vanadate phosphor is activated by $7 \times 10^{-2}$ g to $8 \times 10^{-2}$ g of europium per one gram of the yttrium vanadate.

* * * * *